United States Patent [19]
Leung

[11] Patent Number: 6,075,847
[45] Date of Patent: Jun. 13, 2000

[54] METHOD AND APPARATUS FOR DETECTION OF FAX CALLS

[75] Inventor: Nikolai K. N. Leung, Arlington, Va.

[73] Assignee: Qualcomm Inc., San Diego, Calif.

[21] Appl. No.: 09/247,881

[22] Filed: Feb. 10, 1999

[51] Int. Cl.⁷ ..................................................... H04M 11/00
[52] U.S. Cl. .................................. 379/100.17; 379/93.09; 379/100.15; 358/442
[58] Field of Search .............................. 379/93.05–93.09, 379/93.11, 93.14, 93.15, 100.01, 100.12–100.17; 358/400, 434–436, 438, 442, 468

[56] References Cited

U.S. PATENT DOCUMENTS

| | | | |
|---|---|---|---|
| 5,117,453 | 5/1992 | Plasecki et al. | 379/100.17 |
| 5,892,816 | 4/1999 | Shih et al. | 379/100.17 |

*Primary Examiner*—Wing F. Chan
*Attorney, Agent, or Firm*—Philip Wadsworth; Thomas R. Rouse

[57] ABSTRACT

A method and system for detecting fax calls in a network that alternatively operates in either a voice mode or a fax mode. A detection threshold is first initialized, a first detector detects whether a calling tone has been transmitted from a calling fax machine to a called fax machine, and a second detector detects whether an identification tone has been sent from the called fax machine to the calling fax machine. If the calling tone has been transmitted from the calling fax machine to the called fax machine the detection threshold is decremented a first amount, if the identification tone has been transmitted from the called fax machine to the calling fax machine the detection threshold is decremented a second amount, and if both the calling tone and the identification tone have been sent the detection threshold is decremented a third amount. A flag measure is generated by monitoring, with a third detector, signals sent from the called fax machine. The flag measure is representative of the number of information flags detected by the third detector. The flag measure is compared to the detection threshold and, if the flag measure exceeds the detection threshold, a fax call is detected. The detection of the fax call may then be used to switch a network from voice mode to fax mode. The vocoder used in the voice mode is temporarily muted when the detection threshold is first exceeded in order to confirm the existence of the fax call before switching from voice mode to fax mode.

36 Claims, 5 Drawing Sheets

METHOD AND APPARATUS FOR DETECTION OF FAX CALLS

BACKGROUND OF THE INVENTION

I. Field of the Invention

The present invention relates generally to systems for transmitting, receiving and recognizing digital signals representative of fax calls. More particularly, the present invention relates to systems and methods for quickly and reliably detecting fax calls. Even more particularly, the present invention relates to networks that operate in multiple modes in order to support both fax and voice transmissions, and to systems and methods for reliably switching such networks between their fax and voice modes.

II. Description of the Related Art

For a standard Group 3 fax communication system, the timing and synchronization between fax machines conform to the requirements specified in "ITU-T Recommendation T.30: Procedures for Document Facsimile Transmission in the General Switched Telephone Network," hereinafter referred to as "the T.30 Fax Protocol," and incorporated herein by reference. The T.30 Fax Protocol uses a number of modulation techniques for transmission of message data. In particular, parameter negotiation and handshaking between fax machines is accomplished using the modulation technique specified in "CCITT Recommendation V.21: 300 bps Duplex Modem Standard for Use in the General Switched Telephone Network," hereinafter referred to as "V.21" or "the V.21 Standard" and also incorporated herein by reference.

In a fax system that conforms to the T.30 Fax Protocol, messages conforming to the V.21 Standard (hereinafter referred to as "V.21 messages") are sent between a calling fax machine and a called fax machine in establishing a call. A calling fax machine initiates a call by dialing the called fax machine and sending a calling tone (referred to as a CNG tone). The called fax machine detects the incoming call and sends a called station identification tone (referred to as a CED tone) back to the calling fax machine. The called fax machine then sends its digital identification signal to the calling fax machine to inform the calling fax machine of its capabilities. Upon detection of this signal, the calling fax machine sends a digital command signal to inform the called fax machine of the capabilities that the calling fax machine plans to use. Other messages in addition to the above-described initiation signals also take place between fax machines during a call. Such messages include, for example, training signals, information messages and termination messages.

In a fax system that conforms to the T.30 Fax Protocol, each V.21 message sent must include a preamble (referred to as "the V.21 preamble"), which consists of a series of 32 flags (referred to as "the V.21 flags.") The preamble is used to inform the receiver that a message is to be sent, and allows the receiver to synchronize correctly so that the actual message is properly received.

Digital communications systems and networks often support both voice and fax transmissions. These systems process these two forms of data differently and require switching of resources depending on whether voice or fax service is being supported. This switching must be performed quickly and reliably so that the system does not lose relevant fax messages or send fax messages through the system while it is operating in voice mode.

When a dual-mode network is operating in voice mode, the V.21 flags at the beginning of a fax call represent a reliable method of detecting a fax call, because the flag pattern is easily distinguishable from typical voice signals. However, in order to detect the flags reliably, it is necessary to listen for a threshold number of repetitions of the flags before declaring a fax call. Since each flag lasts for 266.7 milliseconds, waiting for these repetitions to occur can require substantial time. However, having to wait too long before switching from voice mode to fax mode can cause the system to lose some of the fax messages. Moreover, not switching from voice mode to fax mode fast enough can cause a significant portion of the initial fax tones to pass through the voice path of the system, thereby corrupting the fax tones or triggering a premature negotiation between the fax machines. In order to prevent such premature negotiation when a network is operating in voice mode, the network must detect the first V.21 message and switch from voice mode to fax mode before the receiving fax machine receives the message.

In order to shorten the time required to detect the V.21 flags, one approach would be to simply lessen that number of flag repetitions that are used as the threshold for declaring that a fax call is in progress. However, this approach can cause a degradation in switching reliability because, if the detector is forced to make a switching decision without a sufficient amount of data, the detector may falsely detect a fax call and switch from voice mode to fax mode. Such a mistake would not be acceptable to users having a conversation, since their conversation would abruptly terminate.

These problems and deficiencies are recognized and solved by the present invention in the manner described below.

SUMMARY OF THE INVENTION

In the methods and apparatuses described herein, a calling fax machine communicates with a called fax machine by sending a calling tone to the called fax machine and the called fax machine responds to the calling tone by sending an identification tone and information flags to the calling fax machine. In a preferred embodiment, the calling and identification tones respectively correspond to CNG and CED tones that conform with the T.30 Fax Protocol, and the information flags correspond to flags present in the preamble of a message that conforms with the V.21 Standard. As explained more fully below, the detection of the calling and identification tones functions in the present invention as a conditioning event which reduces the number of information flags that must otherwise be detected in order to reliably declare the existence of a fax transmission.

In accordance with one aspect of the methods and apparatuses described herein, a detection threshold is first initialized, and a first detector detects whether the calling tone has been transmitted from the calling fax machine to the called fax machine. If the calling tone has been transmitted from the calling fax machine to the called fax machine, the detection threshold is decremented. Next, a flag measure is generated by monitoring, with a second detector, signals sent from the called fax machine. The flag measure is representative of the number of information flags detected by the second detector. The flag measure is compared to the detection threshold and, if the flag measure exceeds the detection threshold, a fax call is detected. The detection of the fax call may then be used to switch a network from voice mode to fax mode.

In accordance with a further aspect of the methods and apparatuses described herein, a detection threshold is first initialized, and a first detector detects whether an identification tone has been transmitted from a called fax machine to a calling fax machine. If the identification tone has been transmitted from the called fax machine to the calling fax machine, the detection threshold is decremented. Next, a flag measure is generated by monitoring, with a second detector, signals sent from the called fax machine. The flag measure is representative of the number of information flags detected by the second detector. The flag measure is compared to the detection threshold and, if the flag measure exceeds the detection threshold, a fax call is detected. Again, the detection of the fax call may then be used to switch a network from voice mode to fax mode.

In accordance with a still further aspect of the methods and apparatuses described herein, a detection threshold is first initialized, a first detector detects whether a calling tone has been transmitted from a calling fax machine to a called fax machine, and a second detector detects whether an identification tone has been sent from the called fax machine to the calling fax machine. If the calling tone has been transmitted from the calling fax machine to the called fax machine the detection threshold is decremented a first amount, if the identification tone has been transmitted from the called fax machine to the calling fax machine the detection threshold is decremented a second amount, and if both the calling tone and the identification tone have been sent the detection threshold is decremented a third amount. Next, a flag measure is generated by monitoring, with a third detector, signals sent from the called fax machine. The flag measure is representative of the number of information flags detected by the third detector. The flag measure is compared to the detection threshold and, if the flag measure exceeds the detection threshold, a fax call is detected. The detection of the fax call may then be used to switch a network from voice mode to fax mode. In a particularly preferred embodiment, the vocoder used in the voice mode is temporarily turned off (or muted) when the detection threshold is first exceeded in order to confirm the existence of the fax call before switching from voice mode to fax mode.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
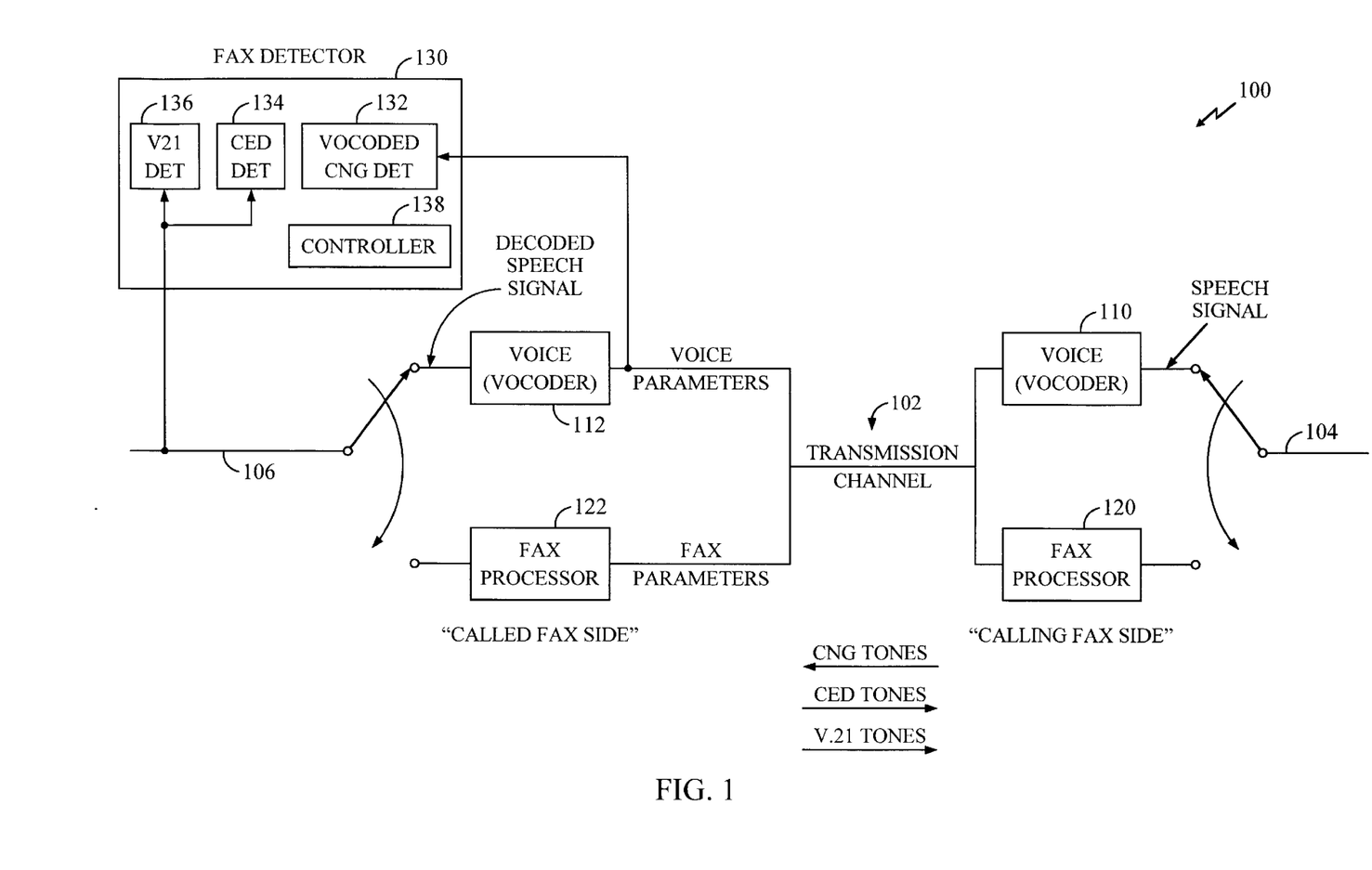
FIG. 1 is a block diagram of a system for detecting a fax call in a network that alternatively operates in either a voice mode or a fax mode.

In FIG. 1 is shown a block diagram illustrating a system 100 for detecting a fax call in a network that alternatively operates in either a voice mode or a fax mode. In the voice mode, a speech signal from line 104 is provided to voice vocoder 110 which converts the speech signal to voice parameters that are then transmitted via transmission channel 102 to voice vocoder 112. Voice vocoder 112 then converts the voice parameters back into an audible speech signal (or decoded speech signal), which may then be transmitted to a user via line 106. It will be understood by those skilled in the art that vocoders 110 and 112 are preferably each adapted to both encode and decode speech signals. Thus, during operation in the voice mode, speech signals from line 106 may also be encoded into voice parameters by vocoder 112. These voice parameters are then transmitted via channel 102 to vocoder 110 where the voice parameters are converted back to a speech signal that is then transmitted to the user via line 104.

In the fax mode, a first (or calling) fax machine (not shown) sends fax signals to a fax processor 120 via line 104. The fax signals include data representative of a fax message, as well as specific tones used for establishing a fax call between the first (or calling) fax machine and a second fax machine (not shown) that is called by the first fax machine. The second fax machine will be referred to hereinafter as the called fax machine. When system 100 is operating in the fax mode, fax signals from fax processor 120 are transmitted via transmission channel 102 to fax processor 122 which outputs fax signals to the called fax machine via line 106. The called fax machine also sends fax signals to the calling fax machine via transmission channel 102. The fax signals from the called fax machine to the calling fax machine also include specific tones used for establishing a fax call between the calling and called fax machines. In the preferred embodiment of system 100, the V.21 Standard is used to accomplish handshaking and parameter negotiation between the calling fax machine and the called fax machine. In addition, the timing and synchronization between the calling fax machine and the called fax machine is preferably accomplished in accordance with the T.30 Fax Protocol.

As described more fully below, system 100 also includes a fax detector 130 which functions during voice mode operations to detect whether a fax call is being established across the transmission channel 102. In response to the detection of a fax call by the fax detector 130, system 100 switches from voice mode to fax mode by decoupling vocoders 110 and 112 from lines 104 and 106, respectively, and by coupling lines 104 and 106 to fax processors 120 and 122, respectively.

Fax detector 130 includes a first detector 132 for detecting a calling tone sent from the calling fax machine to the called fax machine while system 100 is operating in voice mode. In a preferred embodiment, first detector 132 is adapted to detect the CNG calling tone (as specified in the T.30 Fax Protocol) when the CNG tone is sent from the calling fax machine to the called fax machine. Since, during voice mode operation, any CNG tone sent across transmission channel 102 will be encoded by vocoder 110, a signal representative of the encoded CNG tone will be provided to vocoder 112. First detector 132 is preferably coupled to the input of vocoder 112 and is adapted to detect the presence of a "vocoded CNG tone" in the signal provided to vocoder 112. The first detector 132 analyzes vocoder parameters that correspond to a CNG tone, and may advantageously be trained by recording vocoder parameters when a CNG tone is passed through the vocoder 112.

Fax detector 130 also includes a second detector 134 for detecting an identification tone sent from the called fax machine to the calling fax machine while system 100 is operating in voice mode. In a preferred embodiment, second detector 134 is adapted to detect the CED identification tone (as specified in the T.30 Fax Protocol) when the CED tone is sent from the called fax machine to the calling fax machine. In the embodiment shown in FIG. 1, second detector 134 is coupled directly to line 106. Accordingly, second detector 134 functions in this embodiment to detect actual CED tones (rather than encoded versions of such tones).

Fax detector 130 also includes a third detector 136 for detecting information flags sent from the called fax machine to the calling fax machine while system 100 is operating in voice mode. In a preferred embodiment, third detector 136 is adapted to detect flags in the preamble of a message that conforms with the V.21 Standard when such flags are sent from the called fax machine to the calling fax machine. As mentioned above, the V.21 preamble consists of a sequence of 32 flags (8 bits/flag). The flags in this sequence can be detected using a BFSK demodulator. In the embodiment shown in FIG. 1, third detector 136 (e.g., a BFSK demodulator) is coupled directly to line 106. Accordingly, third detector 136 functions in this embodiment to detect actual V.21 flags (rather than encoded versions of such flags). As explained more fully below, in the preferred embodiment, third detector 136 maintains a count representing the number of V.21 flags detected on line 106.

The overall operation of detector 130 is controlled by a microprocessor controller 138, which is coupled to each of the detectors 132, 134 and 136. The operation of controller 138 is preferably controlled by software that runs on the microprocessor. In a preferred embodiment, the functions performed by the software operating on controller 138 correspond to the method steps shown in FIGS. 2A and 2B.

Figure 2A:
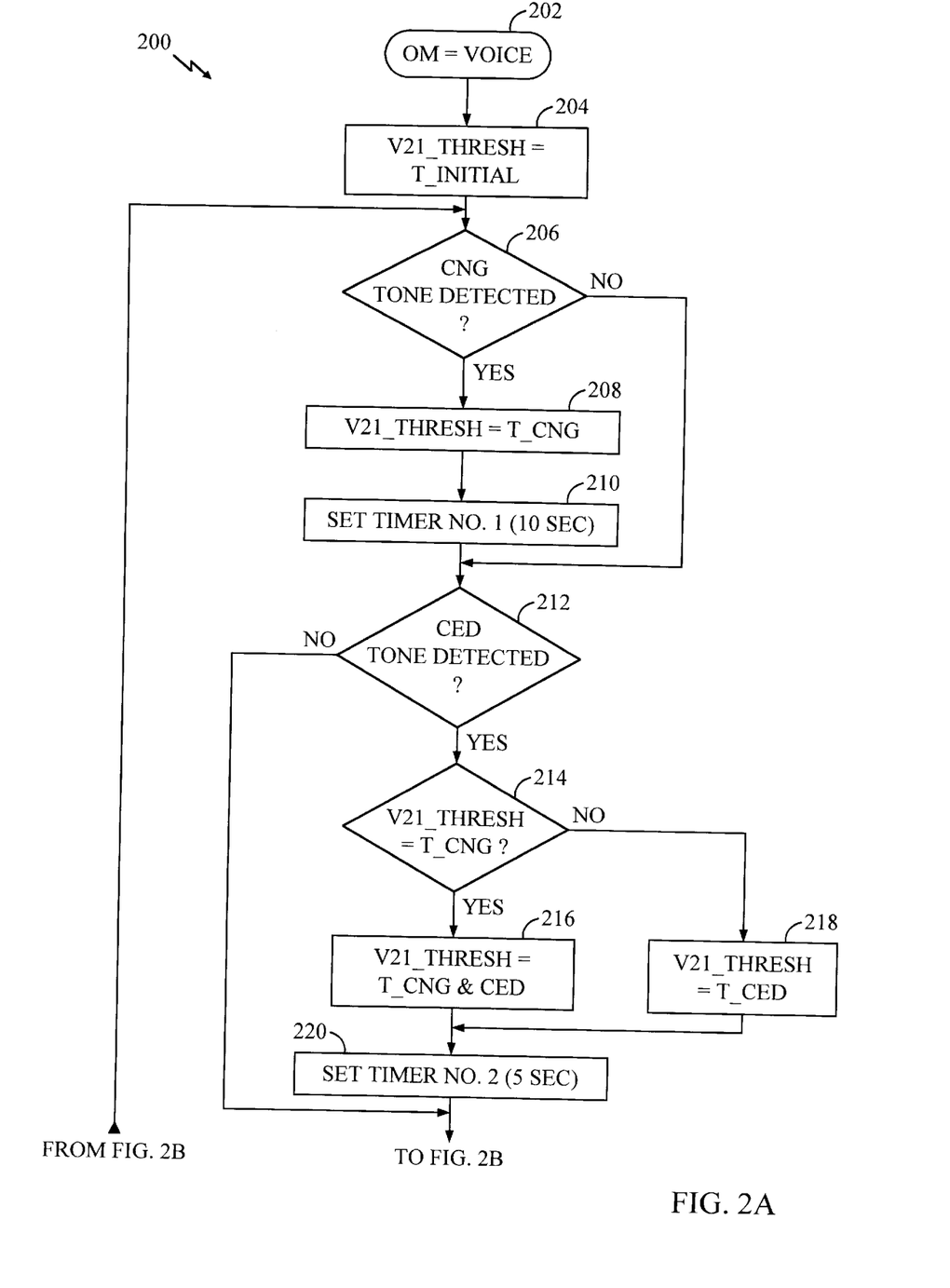
FIGS. 2A and 2B are a flow diagram of a method for detecting a fax call in a network that alternatively operates in either a voice mode or a fax mode.
Figure 2B:
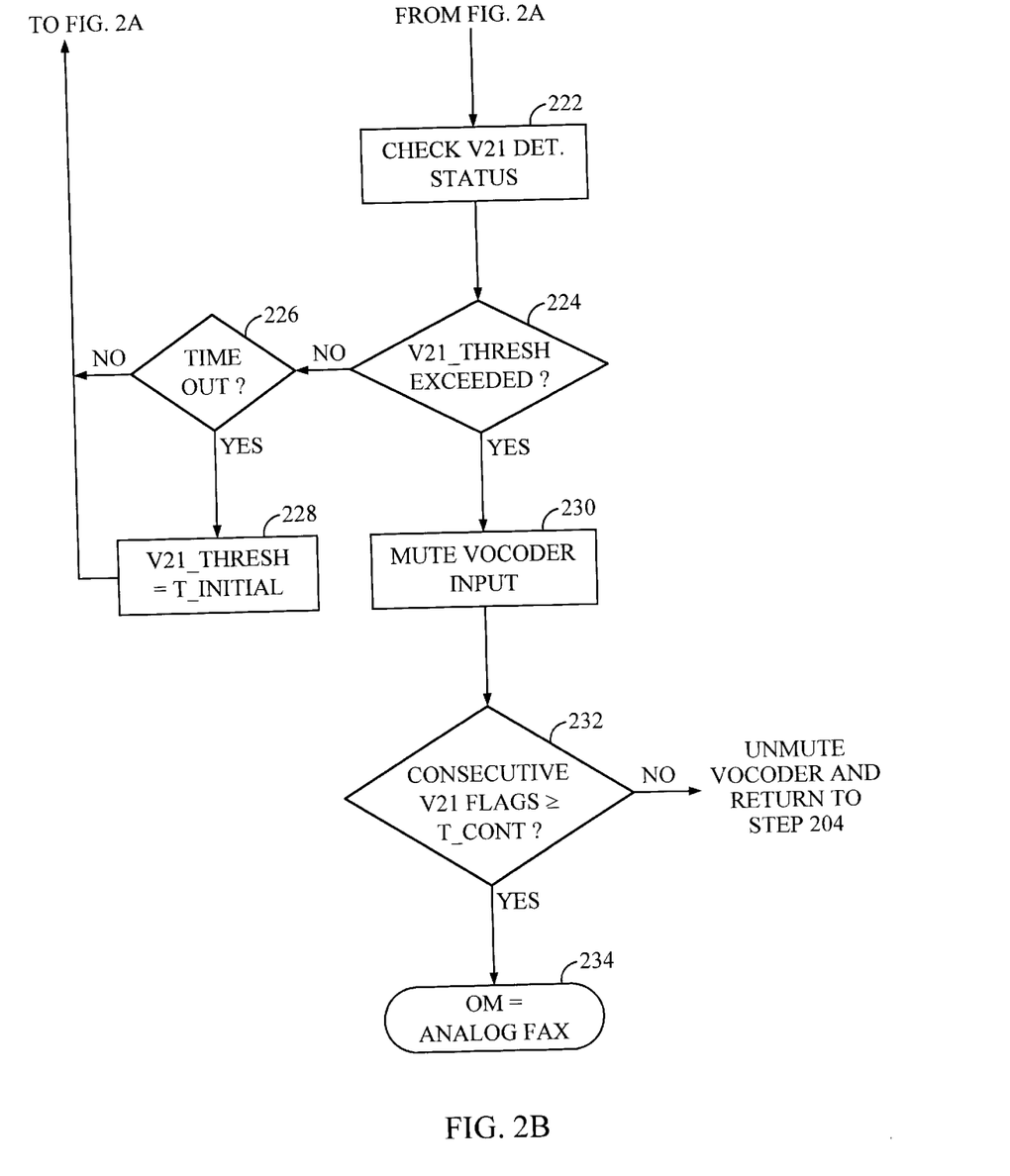

FIGS. 2A and 2B show a method 200 for detecting a fax call in a network that alternatively operates in either a voice mode or a fax mode. In particular, method 200 is used while the network is operating in the voice mode to detect the existence or initiation of a fax call. Thus, at the beginning of method 200 (in step 202), the operating mode (OM) of the network is the voice mode. Next, in step 204, a detection threshold (referred to hereinafter as the "V21_THRESHOLD"), is initialized to a first value ("T_INITIAL"). In step 206, the output of detector 132 is sampled to determine whether detector 132 has detected a signal representative of a CNG tone. If the CNG tone is detected, then in steps 208 and 210 the value of the V21_THRESHOLD is decremented to a second value ("T_CNG"), and a first timer is initialized to a first time period, preferably equal to about 10 seconds. The first timer is preferably implemented using the controller 138. After the first timer is initialized in step 210, the first timer immediately begins counting down to zero.

In step 212, the output of detector 134 is sampled to determine whether detector 134 has detected a signal representative of a CED tone. If the CED tone is detected, then in step 214 the system tests the current value of the V21_THRESHOLD. If the current value of the V21_THRESHOLD equals T_CNG (i.e., if a CNG tone was detected in step 206), then in step 216 the value of the V21_THRESHOLD is decremented to a further value ("T_CND&CED"); otherwise, in step 218 the value of the V21_THRESHOLD is decremented to a value ("T_CED"). In a preferred embodiment, T_CND&CED is smaller than T_CED which, in turn, is smaller than T_CNG. In addition, if the CED tone is detected in step 212, then in step 220 a second timer is initialized to a second time period, preferably equal to about 5 seconds. The second timer is preferably implemented using the controller 138. After the second timer is initialized in step 220, the second timer immediately begins counting down to zero.

Next, in step 222, the output of detector 136 is sampled to determine the number of V.21 flags that detector 136 has detected. In step 224, the number of V.21 flags detected by the detector 136 is compared to the current value of V21_THRESHOLD. If the number of V.21 flags detected by the detector 136 exceeds the value of the V21_THRESHOLD, this corresponds to the detection of a fax call on the network. However, in a preferred embodiment of the present invention, the existence of the fax call is confirmed by yet a further test before switching the network from voice mode to fax mode. Accordingly, if the V21_THRESHOLD is exceeded in step 224, then in step 230 the output of vocoders 110, 112 are muted (i.e., either vocoder 112 does not encode or vocoder 110 does not output audio to line 104, such that both vocoders 110, 112 effectively mute tones to line 104) and detector 136 is initialized and begins monitoring line 106 for the presence of consecutive V.21 flags (i.e., an uninterrupted pattern of V.21 flags). In step 232, the output of detector 136 is again sampled to determine the number of consecutive V.21 flags detected, and the number of consecutive V.21 flags detected is compared against a further threshold, "T_CONT." If the T_CONT threshold value has been exceeded, this corresponds to confirmation that a fax call was detected in step 224, and in step 234 the operating mode of the system is switched to fax mode. Alternatively, if the T_CONT threshold was not exceeded in step 232, then the vocoder is unmuted and the process described above is repeated from step 204.

Referring still to FIG. 2B, if the V21_THRESHOLD was not exceeded in step 224, then in step 226 the system tests to determine whether either the first or second timer has timed-out (i.e., whether the first or second timer has counted down to zero). If either of the timers has timed-out, then in step 228 the value of the V21_THRESHOLD is re-initialized to T_INITIAL. Thereafter, the process described above is repeated from step 206.

In a preferred embodiment, the values assigned to the V21_THRESHOLD during operation of method 200 are set forth in Table I below:

T_INITIAL=4 V.21 flags
T_CNG=3 V.21 flags
T_CED=2 V.21 flags
T_CNG&CED=1 V.21 flag
T_CONT=10 V.21 flags
TABLE I It will be understood by those skilled in the art that the particular values assigned to T_INITIAL, T_CNG, T_CED, T_CNG&CED and T_CONT in the preferred embodiment of the invention represent a matter of design choice, and that it is within the scope of the present invention to implement method 200 using values for T_INITIAL, T_CNG, T_CED, T_CNG&CED and T_CONT other than those set forth above.

In the preferred embodiment described above, the third detector 136 is formed of a BFSK demodulator which counts the number of V.21 flags that are detected on line 106. It will be understood by those skilled in that art that other parameters of the fax signal may alternatively be measured by the third detector 136 and then be used as a basis for declaring the existence of a fax call. For example, in one such alternate embodiment, detector 136 is adapted to measure a quantity representing the relative power of the signal on line 106 within a frequency band associated with the V.21 flags divided by the total signal power. To determine the relative power, the total signal on line 106 is applied to bandpass filters having frequencies associated with the V.21 flags. In particular, the signal on line 106 is applied to two bandpass filters, one having a frequency of 1650 Hz and the other having a frequency of 1850 Hz. The power of the two filtered signals are then summed and divided by the total power of the signal on line 106. If the signal on line 106 is a true fax signal (as opposed to a voice signal), most of the power of the signal should lie within the filtered bands. In this alternative embodiment, the values assigned to the detector threshold (V21_THRESHOLD) in method 200 correspond to percentages of the total power lying within the filter bands or lengths of time during which these percentages fall within an acceptable range. Exemplary values to be assigned to the V21_THRESHOLD during operation of method 200 in connection with this alternative embodiment are set forth in Table II below:

T_INITIAL=90% of total power=50 ms (time based)
T_CNG=85% of total power=40 ms (time based)
T_CED=80% of total power=30 ms (time based)
T_CNG&CED=75% of total power=20 ms (time based)
T_CONT=95% of total power=500 ms (time based)
TABLE II Again, it will be understood by those skilled in the art that the particular values assigned to T_INITIAL, T_CNG, T_CED, T_CNG&CED and T_CONT in the above described first alternative embodiment of the invention represent a matter of design choice, and that it is within the scope of the present invention to implement method 200 in accordance with this alternative embodiment using values for T_INITIAL, T_CNG, T_CED, T_CNG&CED and T_CONT other than those set forth above.

In connection with a second alternate embodiment, detector 136 may be adapted to detect the spectral shape of the signal on line 106. Since the frequency spectrum associated with the flags in the V.21 preamble has a well defined shape, the larger the difference between the frequency spectrum of the signal on line 106 and the frequency spectrum of a true V.21 preamble signal, the less likely it is that the signal on line 106 is a true fax signal. To compute the spectral shape of the signal on line 106, the signal on line 106 is preferably normalized and applied to a FFT algorithm to derive a frequency-domain signal. The magnitude of this frequency domain signal (at certain frequencies) is then subtracted from corresponding magnitudes of a true V.21 preamble signal, and this total difference is then be used for thresholding in steps 224 and 232 to detect and confirm whether a fax signal is present.

Figure 3:
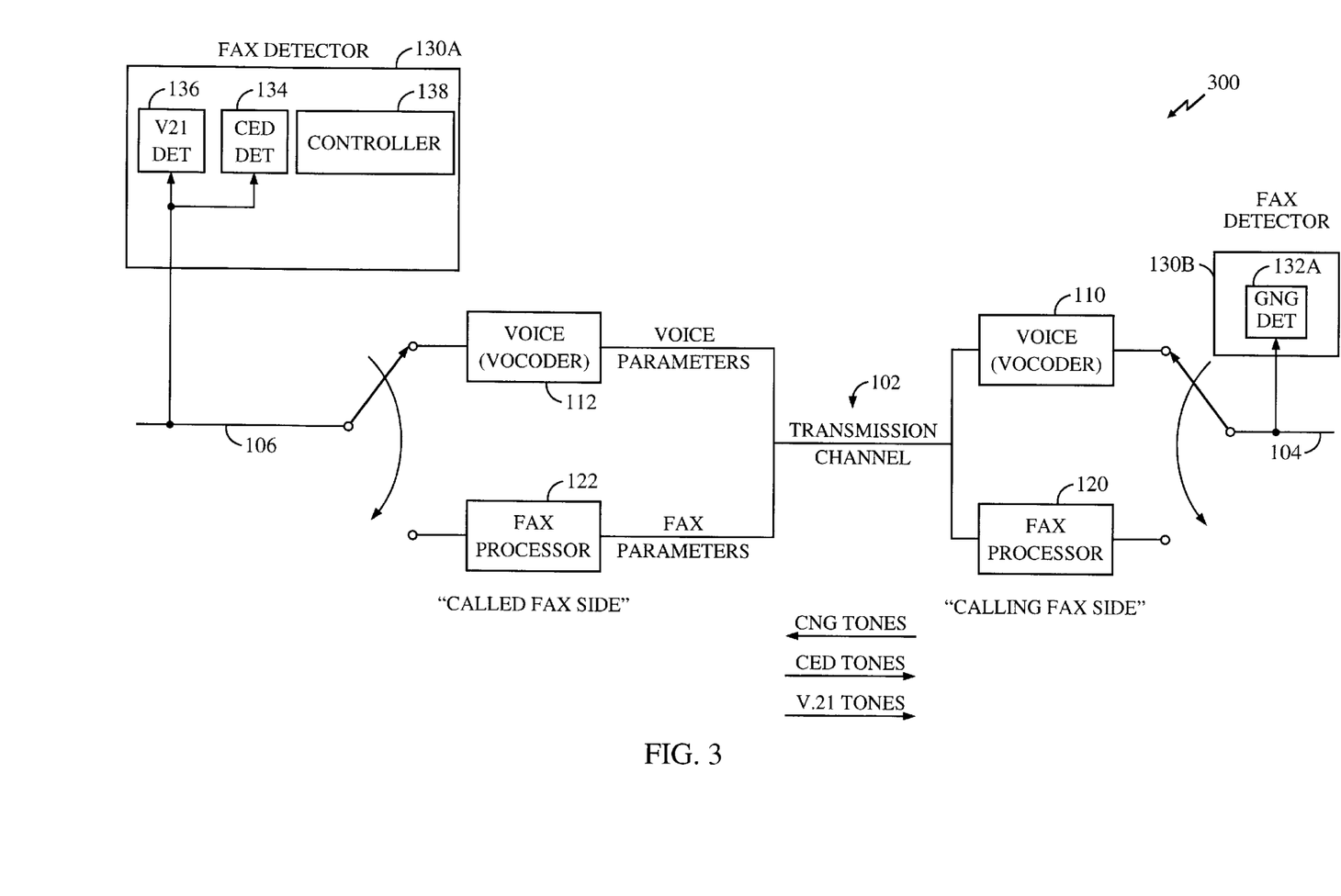
FIG. 3 is a block diagram of a system for detecting a fax call in a network that operates in either a voice mode or a fax mode, in accordance with an alternative preferred embodiment of the present invention.

FIG. 3 is a block diagram of a system 300 for detecting a fax call in a network that operates in either a voice mode or a fax mode, in accordance with an alternative preferred embodiment of the present invention. System 300 functions substantially the same as system 100, except in system 300 the portions of the fax detector are positioned on either side of transmission channel 102. In particular, in system 300 the fax detection system is formed of a first fax detector 130a on the "called fax side" of transmission channel 102 and a second fax detector 130b on the "calling fax side" of transmission channel 102. The first fax detector 130a includes detectors 134 and 136 and controller 138, each of which functions as described above in connection with FIG. 1. The second fax detector 130b includes a detector 132a which functions to detect a calling tone (preferably a CNG tone) on line 104. In contrast to detector 132, detector 132a functions to detect actual calling tones (rather than an encoded version of such tones).

Figure 4:
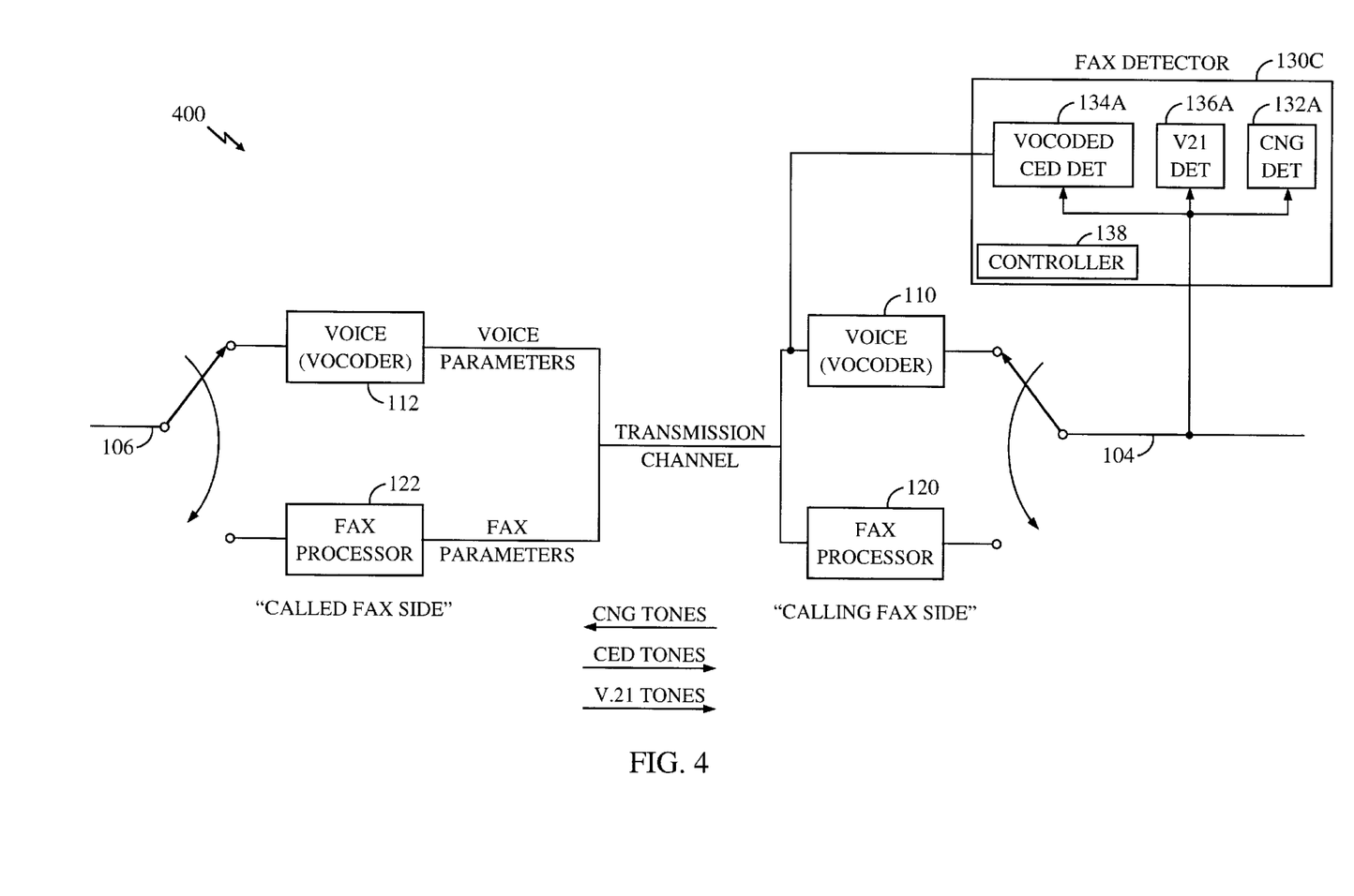
FIG. 4 is a block diagram of a system for detecting a fax call in a network that operates in either a voice mode or a fax mode, in accordance with a still further alternative preferred embodiment of the present invention.

FIG. 4 is a block diagram of a system 400 for detecting a fax call in a network that operates in either a voice mode or a fax mode, in accordance with a still further alternative preferred embodiment of the present invention. System 400 functions substantially the same as system 100, except in system 400 the fax detector 130c is positioned on the "calling fax side" (rather than the "called fax side") of transmission channel 102. The fax detector 130c includes detector 136a (in contrast to detector 136, detector 136a operates on vocoded V.21 flags) and controller 138, each of which functions as described above in connection with FIG. 1 (except as noted with respect to detector 136a), and detector 132 which functions as described above in connection with FIG. 3. The fax detector 130c includes a detector 134a which functions to detect an identification tone (preferably a CED tone) on line 104. In contrast to detector 134, detector 134a functions to detect an encoded version of an identification tone (rather than a non-encoded version of such tone). The detector 134a is advantageously trained to look for vocoder parameters corresponding to a CED tone.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. In a fax system wherein a calling fax machine communicates with a called fax machine by sending a calling tone to the called fax machine and wherein the called fax machine sends information flags to the calling fax machine, a method for detecting a fax call comprising the steps of:

(a) initialing a detection threshold;

(b) detecting whether the calling tone has been transmitted from the calling fax machine to the called fax machine;

(c) decrementing the detection threshold if the calling tone has been detected in step (b);

(d) generating a flag measure by monitoring, with a detector, signals sent from the called fax machine, wherein the flag measure is representative of a number of information flags detected by the detector;

(e) comparing the flag measure to the detection threshold; and (f) detecting the fax call in accordance with the result of step (e).

2. The method of claim 1, wherein the flag measure is generated in step (d) by monitoring a parameter in the signals, the parameter being representative of the number of selected information flags present in the signals.

3. The method of claim 2, wherein the selected information flags represent flags in the preamble of a message that conforms with the V.21 Standard.

4. The method of claim 2, wherein the parameter monitored in step (d) corresponds to an in-band power level associated with the signals.

5. The method of claim 4, wherein the in-band power level corresponds to power in frequency bands positioned at about 1650 Hz and 1850 Hz.

6. The method of claim 2, wherein the parameter monitored in step (d) is determined in accordance with a spectral shape associated with the signals.

7. In a fax system wherein a calling fax machine communicates with a called fax machine by sending a calling tone to the called fax machine and wherein the called fax machine responds to the calling tone by sending an identification tone and information flags to the calling fax machine, a method for detecting a fax call, comprising the steps of:

(a) initializing a detection threshold;

(b) detecting whether the identification tone has been transmitted from the called fax machine to the calling fax machine;

(c) decrementing the detection threshold if the identification tone has been detected in step (b);

(d) generating a flag measure by monitoring, with a detector, signals sent from the called fax machine, wherein the flag measure is representative of a number of information flags detected by the detector;

(e) comparing the flag measure to the detection threshold; and (f) detecting the fax call in accordance with the result of step (e).

8. The method of claim 7, wherein the flag measure is generated in step (d) by monitoring a parameter in the signals, the parameter being representative of the number of selected information flags present in the signals.

9. The method of claim 8, wherein the selected information flags represent flags in the preamble of a message that conforms with the V.21 Standard.

10. The method of claim 8, wherein the parameter monitored in step (d) corresponds to an in-band power level associated with the signals.

11. The method of claim 10, wherein the in-band power level corresponds to power in frequency bands positioned at about 1650 Hz and 1850 Hz.

12. The method of claim 8, wherein the parameter monitored in step (d) is determined in accordance with a spectral shape associated with the signals.

13. In a fax system wherein a calling fax machine communicates with a called fax machine by sending a calling tone to the called fax machine and wherein the called fax machine responds to the calling tone by sending an identification tone and information flags to the calling fax machine, a method for detecting a fax call, comprising the steps of:

(a) initializing a detection threshold to a first value;

(b) detecting whether the calling tone has been transmitted from the calling fax machine to the called fax machine;

(c) reducing the detection threshold to a second value if the calling tone has been detected in step (b), the second value being smaller than the first value;

(d) detecting whether the identification tone has been transmitted from the called fax machine to the calling fax machine;

(e) reducing the detection threshold to a third value if the identification tone has been detected in step (d) and the calling tone has not been detected in step (b), the third value being smaller than the second value;

(f) reducing the detection threshold to a fourth value if the identification tone has been detected in step (d) and the calling tone has been detected in step (b), the fourth value being smaller than the third value;

(g) generating a first flag measure by monitoring, with a detector, signals sent from the called fax machine, wherein the first flag measure is representative of a number of information flags detected by the detector;

(h) comparing the first flag measure to the detection threshold; and (i) detecting the fax call in accordance with the result of step (h).

14. The method of claim 13, wherein step (i) comprises the steps of:

(a) muting a vocoder input if the first flag measure exceeds the detection threshold;

(b) while the vocoder is muted, generating a second flag measure by monitoring signals sent from the called fax machine, wherein the second flag measure is representative of a number of consecutive information flags sent from the called fax machine;

(c) setting the detection threshold to a fifth value, the fifth value being greater than the first value;

(d) after step (i)(3), comparing the second flag measure to the detection threshold; and (e) detecting the fax call if the second flag measure exceeds the detection threshold.

15. The method of claim 13, further comprising the step of setting a first time if the calling tone is detected in step (b).

16. The method of claim 15, wherein step (h) comprises the steps of:

(a) comparing the first flag measure to the detection threshold;

(b) if the first flag measure to the detection threshold, determining whether the first timer has timed out; and (c) initializing the detection threshold to the first value if the first timer has timed out.

17. The method of claim 15, further comprising the step of setting a second timer if the identification tone is detected in step (d).

18. The method of claim 17, wherein step (h) comprises the steps of:

(a) comparing the first flag measure to the detection threshold;

(b) if the first flag measure does not exceed the detection threshold, determining whether the first timer or the second timer has timed out; and (c) initializing the detection threshold to the first value if either the first timer or the second timer has timed out.

19. The method of claim 18, wherein the first timer times out in a first predetermined time period, the second timer times out in a second predetermined time period, and the first predetermined time period is longer than the second predetermined time period.

20. The method of claim 13, wherein the first flag measure is generated in step (g) by monitoring a parameter in the signals, the parameter being representative of the number of selected information flags present in the signals.

21. The method of claim 20, wherein the selected information flags represent flags in the preamble of a message that conforms with the V.21 Standard.

22. The method of claim 21, wherein the parameter monitored in step (g) corresponds to an in-band power level associated with the signals.

23. The method of claim 22, wherein the in-band power level corresponds to power in frequency bands positioned at about 1650 Hz and 1850 Hz.

24. The method of claim 20, wherein the parameter monitored in step (g) is determined in accordance with a spectral shape associated with the signals.

25. The method of claim 13, wherein the calling fax machine and the called fax machine are coupled by a transmission channel, and wherein the detector is positioned between the called fax machine and the transmission channel.

26. The method of claim 13, wherein the calling fax machine and the called fax machine are coupled by a transmission channel and the detector is formed of a first fax detector and a second fax detector, the first fax detector being positioned between the transmission channel and the called fax machine and the second fax detector being positioned between the calling fax machine and the transmission channel, wherein the first fax detector is used for detecting the identification tone and the information flags, and wherein the second fax detector is used for detecting the calling tone.

27. The method of claim 13, wherein the calling fax machine and the called fax machine are coupled by a transmission channel, and wherein the detector is positioned between the calling fax machine and the transmission channel.

28. The method of claim 13, wherein the calling tone corresponds to a CNG tone that conforms with the T.30 Fax Protocol.

29. The method of claim 13, wherein the identification tone corresponds to a CED tone that conforms with the T.30 Fax Protocol.

30. The method of claim 13, further comprising the step of switching a network between a voice mode and a fax mode in accordance with the step of detecting the fax call in step (i).

31. In a fax system wherein a calling fax machine communicates with a called fax machine by sending a calling tone to the called fax machine and wherein the called fax machine responds to the calling tone by sending an identification tone and information flags to the calling fax machine, an apparatus for detecting a fax call, comprising:
  (a) a first detector that detects whether the calling tone has been transmitted from the calling fax machine to the called fax machine;
  (b) a second detector that detects the information flags transmitted form the called fax machine to the calling fax machine; and
  (c) a controller, coupled the first detector the second detector, the controller including means for decrementing a detection threshold if the calling tone has been transmitted from the calling fax machine to the called fax machine, means for generating a flag measure that is representative of a number of information flags detected by the second detector, and means for comparing the flag measure to the detection threshold.

32. In a fax system wherein a calling fax machine communicates with a called fax machine by sending a calling tone to the called fax machine and wherein the called fax machine responds to the calling tone by sending an identification tone and information flags to the calling fax machine, an apparatus for detecting a fax call, comprising:
  (a) a first detector that detects whether the identification tone has been transmitted from the called fax machine to the calling fax machine;
  (b) a second detector that detects the information flags transmitted from the called fax machine to the calling fax machine; and
  (c) a controller, coupled the first detector and the second detector, the controller including means for decrementing a detection threshold if the identification tone has been transmitted from the called fax machine to the calling fax machine, means for generating a flag measure that is representative of a number of information flags detected by the second detector, and means for comparing the flag measure to the detection threshold.

33. In a fax system wherein a calling fax machine communicates with a called fax machine by sending a calling tone to the called fax machine and wherein the called fax machine responds to the calling tone by sending an identification tone and information flags to the calling fax machine, an apparatus for detecting a fax call, comprising:
  (a) a first detector that detects whether the calling tone has been transmitted from the calling fax machine to the called fax machine;
  (b) a second detector that detects whether the identification tone has been transmitted from the called fax machine to the calling fax machine;
  (c) a third detector that detects information flags transmitted from the called fax machine to the calling fax machine; and
  (d) a controller, coupled the first detector, the second detector and the third detector, the controller including means for decrementing a detection threshold if the calling tone has been transmitted from the calling fax machine to the called fax machine, means for decrementing the detection threshold if the identification tone has been transmitted from the called fax machine to the calling fax machine, means for generating a flag measure that is representative of a number of information flags detected by the third detector, and means for comparing the flag measure to the detection threshold.

34. In a fax system wherein a calling fax machine communicates with a called fax machine by sending a calling tone to the called fax machine and wherein the called fax machine sends information flags to the calling fax machine, an apparatus for detecting a fax call comprising:
  (a) means for initializing a detection threshold;
  (b) first means for detecting whether the calling tone has been transmitted from the calling fax machine to the called fax machine;
  (c) means for decrementing the detection threshold if the calling tone has been detected by the first means for detecting;
  (d) means for generating a flag measure by monitoring, with a second means for detecting, signals sent from the called fax machine, wherein the flag measure is representative of a number of information flags detected by the second means for detecting;
  (e) means for comparing the flag measure to the detection threshold; and
  (f) means for detecting the fax call in accordance with a result of the means for comparing.

35. In a fax system wherein a calling fax machine communicates with a called fax machine by sending a calling tone to the called fax machine and wherein the called fax machine responds to the calling tone by sending an identification tone and information flags to the calling fax machine, an apparatus for detecting a fax call, comprising:
  (a) means for initializing a detection threshold;
  (b) first means for detecting whether the identification tone has been transmitted from the called fax machine to the calling fax machine;
  (c) means for decrementing the detection threshold if the identification tone has been detected by the first means for detecting;
  (d) means for generating a flag measure by monitoring, with a second means for detecting, signals sent from the called fax machine, wherein the flag measure is representative of a number of information flags detected by the second means for detecting;

(e) means for comparing the flag measure to the detection threshold; and (f) means for detecting the fax call in accordance with the result of the means for comparing.

36. In a fax system wherein a calling fax machine communicates with a called fax machine by sending a calling tone to the called fax machine and wherein the called fax machine responds to the calling tone by sending an identification tone and information flags to the calling fax machine, an apparatus for detecting a fax call:

(a) means for initializing a detection threshold to a first value;

(b) first detecting means for detecting whether the calling tone has been transmitted from the calling fax machine to the called fax machine;

(c) first reducing means for reducing the detection threshold to a second value if the calling tone has been detected by the first detecting means, the second value being smaller than the first value;

(d) second detecting means for detecting whether the identification tone has been transmitted from the called fax machine to the calling fax machine;

(e) second reducing means for reducing the detection threshold to a third value if the identification tone has been detected by the second detecting means and the calling tone has not been detected by the first detecting means, the third value being smaller than the second value;

(f) third reducing means for reducing the detection threshold to a fourth value if the identification tone has been detected by the second detecting means and the calling tone has been detected by the first detecting means, the fourth value being smaller than the third value;

(g) means for generating a first flag measure by monitoring, with a third detecting means, signals sent from the called fax machine, wherein the first flag measure is representative of a number of information flags detected by the third detecting means;

(h) means for comparing the first flag measure to the detection threshold; and (i) means for detecting the fax call in accordance with the result of the means for comparing.

* * * * *